(12) United States Patent
Iida et al.

(10) Patent No.: US 8,464,893 B2
(45) Date of Patent: Jun. 18, 2013

(54) PRESSURE CONTAINER AND METHOD OF PRODUCING THE SAME

(75) Inventors: Yasuyuki Iida, Toyota (JP); Natsuhiko Katahira, Toyota (JP); Koichi Takeuchi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1034 days.

(21) Appl. No.: 11/919,037

(22) PCT Filed: Jun. 6, 2006

(86) PCT No.: PCT/JP2006/311689
§ 371 (c)(1),
(2), (4) Date: Oct. 23, 2007

(87) PCT Pub. No.: WO2006/132394
PCT Pub. Date: Dec. 14, 2006

(65) Prior Publication Data
US 2009/0071965 A1 Mar. 19, 2009

(30) Foreign Application Priority Data
Jun. 6, 2005 (JP) .................................. 2005-166212

(51) Int. Cl.
| B65C 3/26 | (2006.01) |
| F17C 1/02 | (2006.01) |
| F17C 1/06 | (2006.01) |
| F17C 1/08 | (2006.01) |
| B65D 1/42 | (2006.01) |
| B65D 6/34 | (2006.01) |
| B65D 8/08 | (2006.01) |
| B65D 85/00 | (2006.01) |

(52) U.S. Cl.
USPC ........... 220/590; 220/586; 220/592; 220/646; 156/156; 206/459.1

(58) Field of Classification Search
USPC . 220/592, 646, 586, 590; 206/459.1; 156/156
See application file for complete search history.

(56) References Cited

U.S. PATENT DOCUMENTS

| 2,966,935 | A | | 1/1961 | Wiltshire |
| 3,449,182 | A | * | 6/1969 | Wiltshire ........................ 156/69 |
| 5,758,796 | A | * | 6/1998 | Nishimura et al. ........... 220/590 |
| 6,089,399 | A | | 7/2000 | Felbaum et al. |

FOREIGN PATENT DOCUMENTS

| JP | 06-47822 A | 2/1994 |
| JP | 07-269794 A | 10/1995 |
| JP | 09-112796 A | 5/1997 |
| JP | 11-13992 A | 1/1999 |
| JP | 11-13994 A | 1/1999 |
| JP | 11-147262 A | 6/1999 |
| JP | 2003-90499 A | 3/2003 |
| JP | 2005-54949 A | 3/2005 |

* cited by examiner

*Primary Examiner* — Anthony Stashick
*Assistant Examiner* — Andrew T Kirsch
(74) *Attorney, Agent, or Firm* — Kenyon & Kenyon LLP

(57) ABSTRACT

A pressure container has an inner shell with a pair of fittings and a reinforcement layer formed around the inner shell, and is configured so that a reinforcement member is attachable to the pair of fittings in a process of forming the reinforcement layer and a functional component which performs a predetermined function is also attachable to the fittings. This can allow the reinforcement member to prevent expanding deformation of the pressure container in production of the pressure container, and can ensure effective use of openings after removal of the reinforcement member.

13 Claims, 9 Drawing Sheets

PRESSURE CONTAINER AND METHOD OF PRODUCING THE SAME

This is a 371 national phase application of PCT/JP2006/311689 filed 6 Jun. 2006, claiming priority to Japanese Patent Application No. 2005-166212 filed 6 Jun. 2005, the contents of which are incorporated herein by reference.

BACKGROUND

The present invention relates to the structure of a pressure container to which a reinforcement member is detachably attached, and a method of producing the pressure container.

In the production of a pressure container for fill gas, when a reinforcement layer is provided around the filling container body, it is necessary to increase the mechanical strength of the filling container body to prevent deformation thereof.

As means of achieving the object, in an invention described in, for example, Japanese Patent Application Laid-Open No. H11-13994, an FRP pressure container is produced by inserting a reinforcement rod through an opening of a filling container body having the opening, abutting the reinforcement rod against the opposite inner wall of the opening to temporarily provide the reinforcement rod in the filling container body, and then providing a reinforcement layer on the outer surface of the filling container body.

SUMMARY

However, the invention described in the publication has a fitting portion provided at the opposite inner wall of the opening of the filling container body and "abuts" the reinforcement rod on the fitting portion in a pressed state. This invention merely prevents deformation of the filling container body in the contracting direction, and cannot prevent expanding deformation.

There is no description of how to handle the fitting portion after removal of the reinforcement rod.

Accordingly, it is an object of the invention to provide a pressure container which can allow a reinforcement member to prevent expanding deformation of the pressure container in production thereof and can ensure effective use of openings after removal of the reinforcement member, and a method of producing the pressure container.

To achieve the object, the present invention provides a pressure container having an inner shell and a reinforcement layer formed around the inner shell, comprising a deformation restricting part to which a reinforcement member is attachable in a process of forming the reinforcement layer and which restricts expanding deformation of the inner shell by interaction with the reinforcement member, the reinforcement member attached in the forming process being removed after the pressure container is completed.

With this structure, as the whole pressure container tends to expand, the deformation restricting part acts to restrict the movement by the structural interaction with the reinforcement member. When the internal pressure becomes higher than the external pressure to apply the force which causes expanding deformation in the process of producing the pressure container, therefore, deformation of the pressure container at least in the expanding direction is prevented.

Further, the reinforcement member which is temporarily used in producing the pressure container is removed after completion of the pressure container, i.e., at the time of using the pressure container, and does not remain in the pressure container. This eliminates the need for a fixing structure for keeping the reinforcement member fixed in the pressure container after completion thereof, or a seal structure in the fixing structure for keeping airtightness between the reinforcement member and a fixing member for fixing the reinforcement member.

The "process of forming the reinforcement layer" is a process including at least one of a process of winding fibers (carbon fibers or the like) by, for example, a filament winding method, a heating process and a cooling process.

For example, the deformation restricting part is a pair of fittings provided at the inner shell. With this structure, as the fitting or the whole pressure container tends to expand, the deformation restricting part acts to restrict the movement. When the internal pressure becomes higher than the external pressure to apply the force which causes expanding deformation in the process of producing the pressure container, therefore, deformation of the pressure container at least in the expanding direction is prevented. In a case where the deformation restricting part also restricts the movement of the fitting in the contracting deformation, contraction of the whole pressure container is also restricted, so that even when the external pressure becomes higher than the internal pressure to apply the force which causes contracting deformation, deformation of the pressure container is prevented.

It is preferable that at least one of the pair of fittings should have a coupling part to couple the reinforcement member thereto. As the coupling part of one of the deformation restricting parts couples the reinforcement member, the structure of the other deformation restricting part restricts the movement of the coupling part for the reinforcement member is fixed to the coupling part. If the other deformation restricting part has a stopper structure to restrict the movement of the fittings in the expanding direction, the deformation restricting part as a whole acts to restrict the expanding deformation of the pressure container. If the other deformation restricting part has a coupling structure to temporarily fix the fittings, the deformation restricting part as a whole acts to restrict the expanding deformation of the pressure container as well as the contracting deformation thereof. It is sufficient that at least one of the fittings is a coupling part and the other one need not be a coupling part. The fitting which is not a coupling part should not necessarily be configured in such a way that a functional component to be described later, which performs a predetermined function, cannot be attached to the fitting, and may initially have a closed structure.

The coupling part is configured so as to detachably couple the fittings and the reinforcement member together. The detachable coupling of the reinforcement member facilitates attachment in the producing process and removal thereafter. An available structure of such a coupling part is a screw structure for the fittings and the reinforcement member. This is because the screw structure makes fixing and release easier.

It is preferable that the coupling part should be configured so that a functional component which performs a predetermined function is attachable thereto. If a functional component is attachable to the coupling part, a functional component can be attached to the coupling part after the pressure container is produced, so that the coupling part can be efficiently used for different purposes at the time of production of the pressure container and after completion thereof.

The reinforcement member and the deformation restricting part may restrict expanding deformation in a lengthwise direction of the pressure container while permitting contracting deformation. As an example, in the structure having a pair of deformation restricting parts, one end side of the reinforcement member and one of the deformation restricting parts have threaded structures screwable to each other, while the other end side of the reinforcement member and the other one of the deformation restricting parts have slidable structures which can ensure relative displacement while keeping an airtight state.

With the structure, even when external force to cause contracting (reducing) deformation of the pressure container in the lengthwise direction thereof during production of the pressure container, the external force can be absorbed without being restricted, making it possible to avoid permanent deformation of the pressure container and occurrence of damages thereon. This eliminates the need for, or reduces, a special countermeasure against the deformation.

The present invention provides a pressure container having an inner shell with a pair of fittings and a reinforcement layer formed around the inner shell, characterized by being configured so that a reinforcement member is attachable to the pair of fittings in a process of forming the reinforcement layer and a functional component which performs a predetermined function is also attachable to the fittings.

With the structure, as the fittings are configured in such a way that a functional component is attachable thereto, the fittings can be used for the purpose of restricting deformation of the pressure container with the reinforcement member attached to the fittings in the process of producing the pressure container, and a functional component can be can be attached in place of the reinforcement member after completion of the pressure container. Therefore, the coupling part can be efficiently used for different purposes at the time of production of the pressure container and after completion thereof.

For example, a seal component provided at least one of the pair of fittings to seal the pressure container is available as the "functional component". The "functional component" may be a pipe provided at least one of the pair of fittings to connect an interior of the pressure container to an outside thereof. Further, the "functional component" may be an assembly of a pipe and a valve member, which are provided at least one of the pair of fittings to connect an interior of the pressure container to an outside thereof. Furthermore, the "functional component" may be a measuring component provided at least one of the pair of fittings to detect a physical amount relating to a fluid state in the pressure container.

Further, the present invention provides a method of producing a pressure container having an inner shell with a fitting and a reinforcement layer formed around the inner shell, comprising forming the reinforcement layer after providing the reinforcement member at the fitting at the time of forming the reinforcement layer around the inner shell after forming the inner shell; removing the reinforcement member from the fitting after forming the reinforcement layer; and attaching a functional component which performs a predetermined function to the fitting with the reinforcement member removed therefrom.

The production method ensures efficient and useful use of the fitting, so that the fitting is used as reinforcement-member attaching means to prevent deformation at the time of forming the reinforcement layer, and as a functional component is attached in place of the reinforcement member after the reinforcement layer is formed, the fitting can be used as an attachment end portion (opening) for the functional component.

BEST MODE FOR CARRYING OUT THE INVENTION

The present invention will be described more specifically by way of embodiments as the best mode of carrying out the invention. The embodiments are merely illustrative and the invention is not to be limited to the embodiments described below, but may be modified and adapted in various forms.

First Embodiment

A first embodiment will be described referring to FIGS. 1 to 5. The embodiment relates to the structure of a pressure container to which a reinforcement member can be attached in the process of forming the reinforcement layer and which has a pair of fittings as a deformation restricting part to restrict expanding deformation of the inner shell by interaction with the reinforcement member. Particularly, the first embodiment relates to a mode which has a coupling part at either side of one fitting to restrict expanding deformation of the pressure container as well as contracting deformation thereof.

Figure 1:
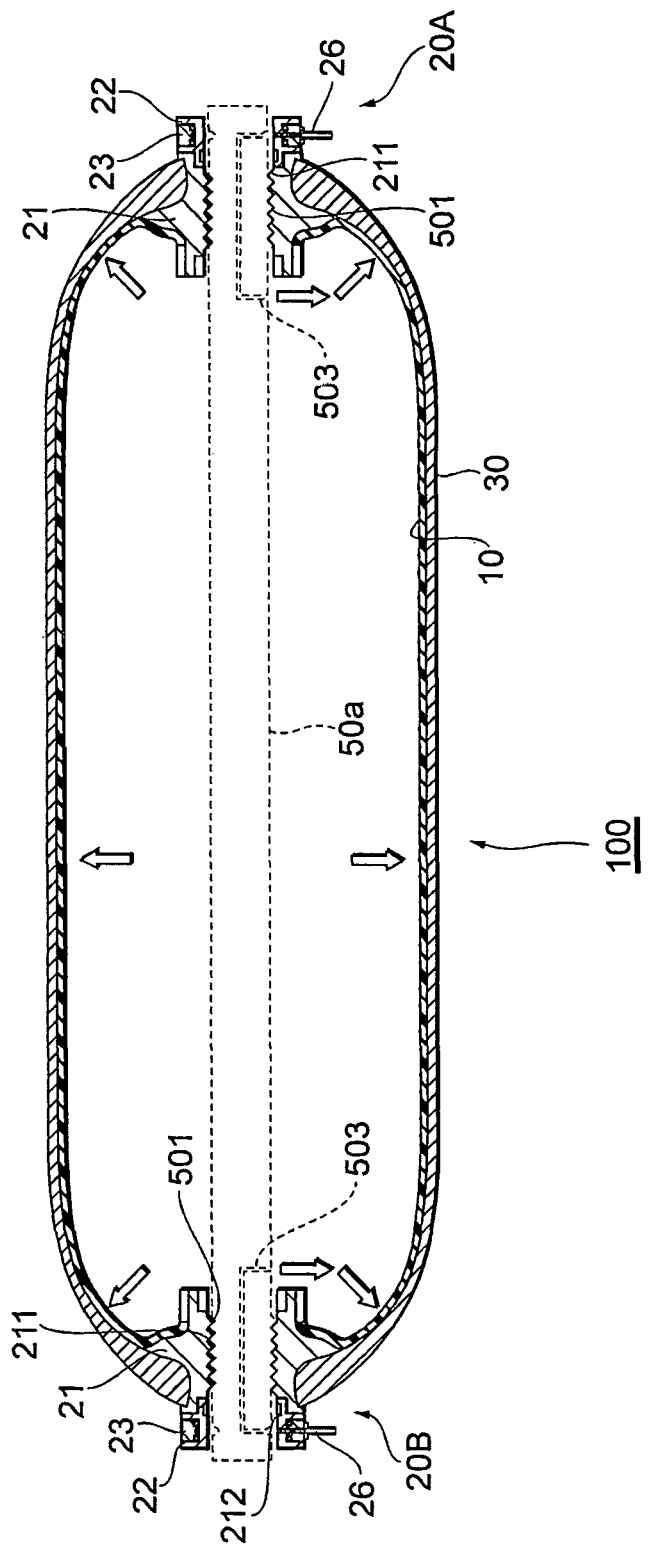
FIG. 1 is a cross-sectional view of a pressure container according to a first embodiment along the axial center.

FIG. 1 is a cross-sectional view of a pressure container (tank) according to the first embodiment along the axial center. As shown in FIG. 1, a pressure container 100 of the first embodiment generally comprises an inner shell (liner) 10, fittings 20A and 20B, and a reinforcement layer 30. A reinforcement member 50a is shown by a broken line for it is temporarily attached for reinforcement during a reinforcement-layer forming process at the time of producing the pressure container 100, and will be removed when the pressure container 100 is completed.

The inner shell (liner) 10 is the inner shell of the pressure container 100, and is made of various thermoplastic resins moldable by heat, such as polyethylene resin, polypropylene resin, polycarbonate, nylon, acryl, polyethylene terephthalate, urethane resin and ABS resin, or metal such as aluminum. The inner shell 10 is generally formed by laser welding of a hemispherical liner of a resin into a container shape.

The reinforcement layer 30 is formed by winding fibers around the inner shell 10 by filament winding method (FW method), and is a structure which provides a sufficient mechanical rigidity even when a gas is filled in the pressure container 100 at a high pressure. The reinforcement layer 30 is also called "outer shell".

As shown in FIG. 1, the metal fittings 20A and 20B according to the invention are arranged at both lengthwise ends of the pressure container 100. In the first embodiment, by the interaction with the metal reinforcement member 50a, each of the fittings 20A and 20B serves as the deformation restricting part and coupling part of the invention. Because the fittings 20A and 20B have the same symmetrical structure in the first embodiment, only the structure of one fitting will be described.

Figure 2:
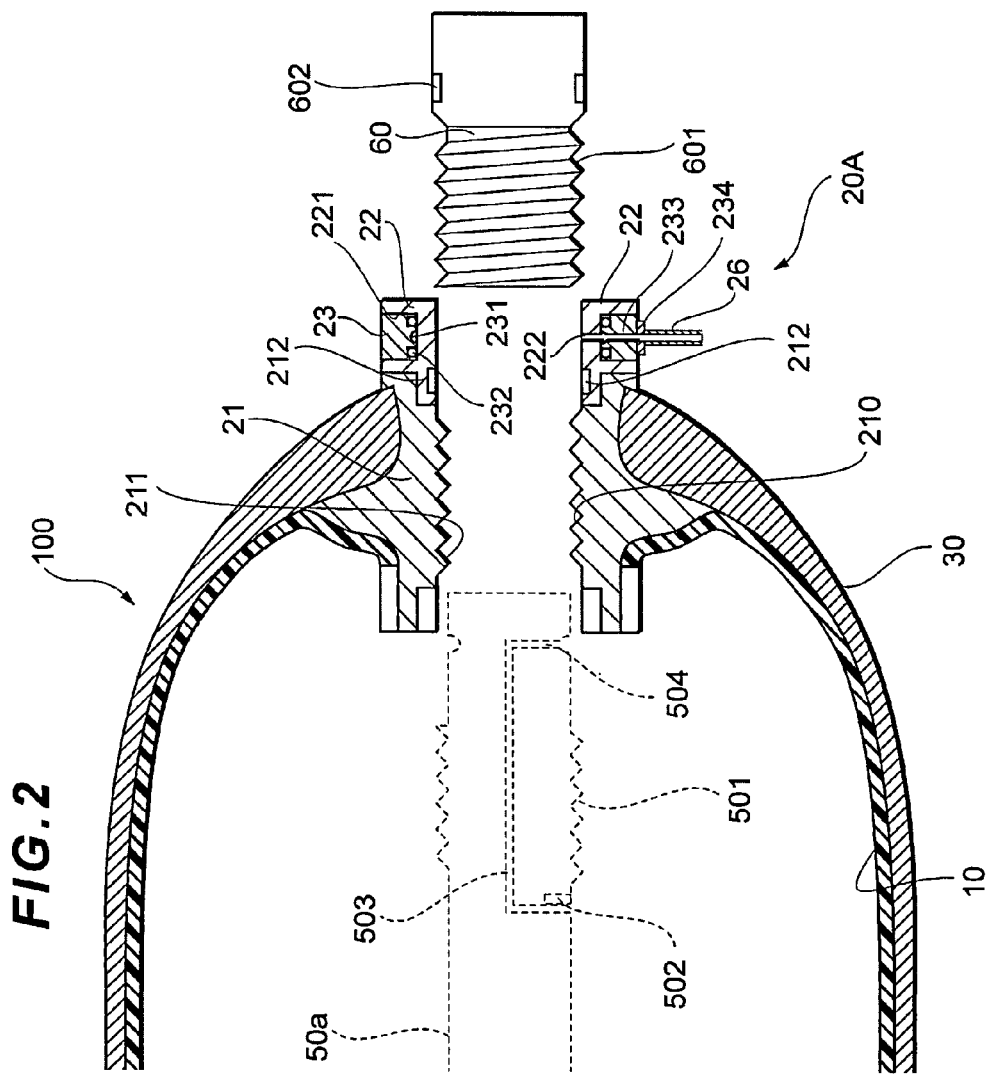
FIG. 2 is an enlarged cross-sectional view the vicinity of one of fittings of the pressure container.

FIG. 2 is an enlarged cross-sectional view of the vicinity of the fitting 20A of the pressure container.

As shown in FIG. 2, a threaded structure 211 is provided on the inner surface of an opening 210 of the fitting 20A in such a way as to be engageable with a threaded structure 501 provided at the reinforcement member 50a at the time of production, and engageable with a threaded structure 601 provided at a functional component 60 after completion. The threaded structure 501 is provided at an end portion of the reinforcement member 50a to be attached at the time of production in such a way as to be engageable with the opening 210 of the fitting 20A. It is preferable that a seal member 212 be provided on the inner wall of the opening 210 of the fitting 20A. The seal member provided can keep the airtightness of the pressure container 100 when the reinforcement member 50a is coupled to the fitting 20, or when the functional component 60 is attached after removal of the reinforcement member 50a. The seal member is an O ring or a packing structure formed of an elastic member, such as elastomer.

It is preferable to provide a seal member 502 around the threaded structure 501 of the reinforcement member 50a or a seal member 602 around the threaded structure 601 of the functional component 60 to further keep the airtightness.

The coupling part of the fitting 20 can be constructed by engagement means other than the screw structure which is however preferable because the screw structure can engage the reinforcement member 50a with the opening 210 more surely.

The fitting 20 generally comprises three parts, a first member 21, a second member 22 and a fixed member 23. The first member 21 and the second member 22 are integrated, and the opening 210 is so provided as to communicate with both. The threaded structure 211 is provided at the opening of the first member 21. The fixed member 23 is fitted into a circumferential groove 221 provided around the second member 22, and can be rotated relative to the second member 22 by an O ring 24 provided at the at a portion which abuts on the circumferential groove 221. At the time of winding, as the fixed member 23 is held on a winding apparatus at both ends of the pressure container 100, the entire pressure container 100 coupled to the second member 22 can be rotated relatively to ensure winding of wires (fibers). A circumferential groove 231 is provided along the circumferential direction at an area inward of the fixed member 23 and held by the O ring 24, and a communication passage 233 which communicates with the outer surface and inner surface of the fixed member 23 is provided in such a way as to communicate with the circumferential groove 231. A vent pipe 26 is fixed to the outersurface side opening of the communication passage 233 by a stopper 234. That portion of the circumferential groove 221 provided at the second member 22 which corresponds to the circumferential groove 231 of the fixed member 23 is provided with a communication passage 221 which communicates with the opening 210.

The reinforcement member 50a is used only at the time of producing the pressure container 100, and is removed when the pressure container 100 is completed. The reinforcement member 50a is a structure which prevents the inner shell 10 of the pressure container 100 from being deformed by strong deformation stress applied when the reinforcement layer 30 is formed. Therefore, the reinforcement member 50a is formed of a material with a high heat resistance, like a metal.

The threaded structures 501 provided at both end portions of the reinforcement member 50a are engageable with the threaded structures 211 of the openings 210 of the fittings 20A and 20B. A communication passage 503 which communicates with the center side and end side of the threaded structure 501 is provided inside the reinforcement member 50a. A circumferential groove 504 is provided at the outer opening of the communication passage 503, so that when the threaded structure 501 is properly engaged with the threaded structure 211 of the opening 210, the communication passage 222 provided at the second member 22 faces the circumferential groove 504.

With the structure, even when the pressure container 100 is generally rotated in the winding process, the interior of the pressure container 100 communicates with the exterior thereof, making it possible to freely feed gas from inside the pressure container 100 or remove the gas. That is, when the fixed members 23 at both ends of the pressure container 100 are fixed to the winding apparatus, the internal air of the pressure container 100 flows from the communication passage 222 of the second member 22 to the circumferential groove 231 of the fixed member 23 and the communication passage 233 through the communication passage 503 and the circumferential groove 504 of the reinforcement member 50, and communicates with the outside air through the vent pipe 26. Even in the production process where the reinforcement member 50a serves as the reinforcement structure for the pressure container 100, the internal air can communicate with the outside air. This makes it possible to raise or lower the internal pressure of the pressure container 100.

Although FIG. 1 shows the communication passages 503 provided at both ends of the reinforcement member 50a, only one communication passage may of course be provided. It is sufficient that the reinforcement member 50a is attachable to the fitting 20 of the inner shell 10 of the pressure container 100 in such a way as to restrict deformation of the inner shell 10, and may be provided not only inside the inner shell but also outside or other locations. The reinforcement member 50a may take a rod shape, a bent shape or any other shape as long as it can restrict deformation of the pressure container 100.

With this structure, as the fitting 20 works as the deformation restricting part of the invention with the interaction with the reinforcement member 50a, i.e., the fitting 20 works to restrict the movement of the pressure container 100 when the whole pressure container 100 tends to expand. When the internal pressure becomes higher than the external pressure to apply the force which causes expanding deformation in the process of producing the pressure container 100, therefore, deformation of the pressure container 100 at least in the expanding direction is prevented. As both of the fittings 20A and 20B at both ends have the threaded structures 211 as coupling parts to couple to the reinforcement member 50a, movement of the fittings 20A and 20B in the contracting direction is also restricted, thus restricting general contraction of the pressure container 100. Even when the external pressure becomes higher than the internal pressure to apply the force which causes contracting deformation, therefore, deformation of the pressure container 100 is prevented.

When the reinforcement member 50a is attached to the pressure container 100 in the process of forming the reinforcement layer 30, the mechanical rigidity of the pressure container 100 increases and deformation of the inner shell 10 of the pressure container 100 in the contracting direction as well as expanding deformation thereof is prevented.

A method of producing the pressure container 100 will be described next referring to FIGS. 3 to 5.

Figure 3:
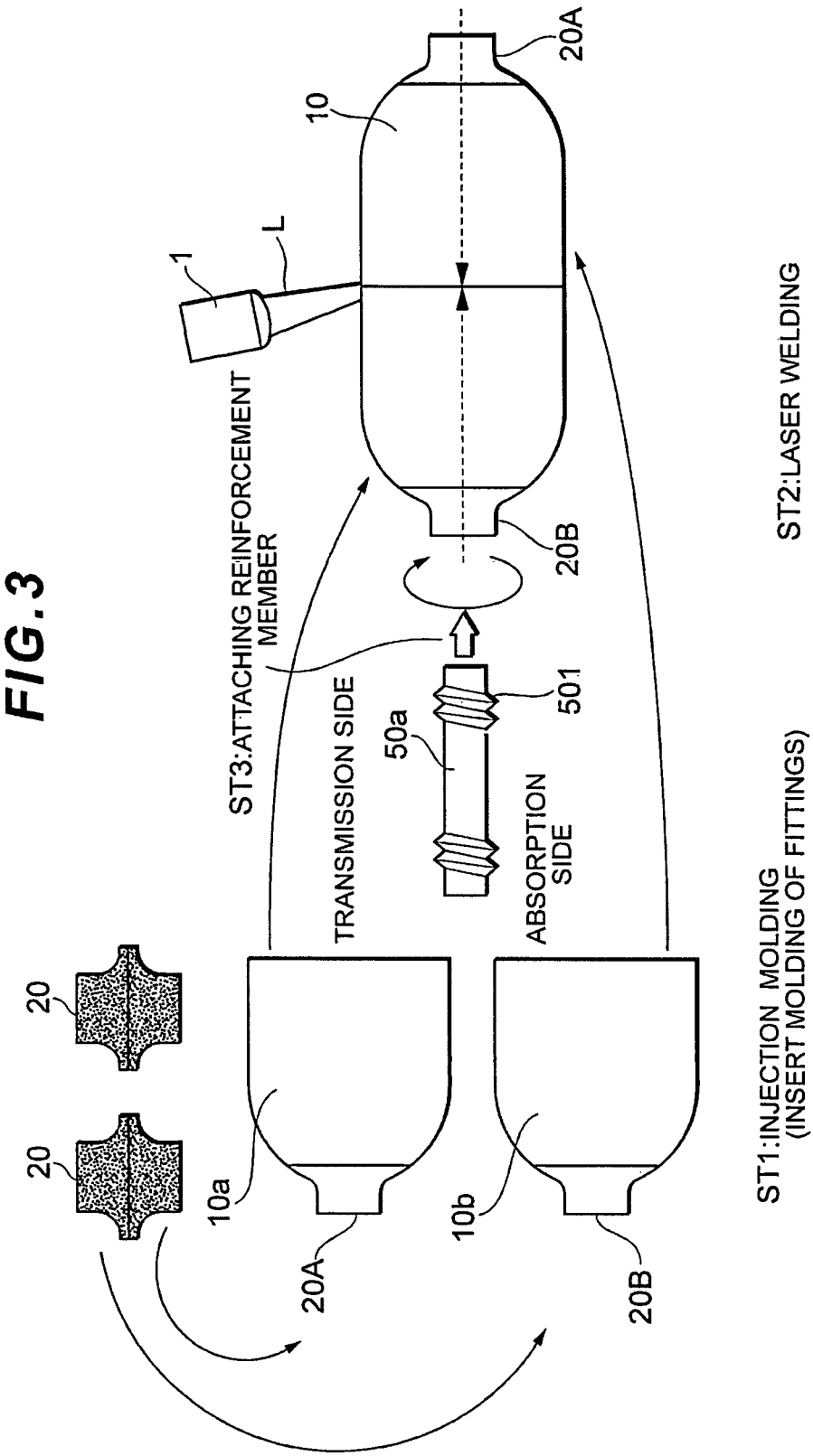
FIG. 3 is a diagram showing individual processes of injection molding, laser welding and attachment of a reinforcement member.

FIG. 3 is a diagram showing procedures of laser-welding hemispherical resin inner shells 10a and 10b with the fittings 20 attached thereto and, more specifically, which have a hemispherical shape and a cylinder part. FIG. 4 is a diagram showing procedures of setting the inner shell 10 with the reinforcement member 50a fixed thereto on the filament winding apparatus, and winding carbon fibers by a predetermined number of layers while rotating the inner shell 10. FIG. 5 is a diagram showing procedures of placing the body of the pressure container 100 in a furnace, and heating it at a predetermined temperature for a given time to harden the carbon fibers.

As illustrated in FIG. 3, first, the fittings 20 are set in a mold and a resin material for the inner shell is injected therein to mold separate hemispherical inner shells 10a and 10b (insert molding of fittings) in an injection molding process (ST1). Next, in a laser welding process (ST2), with the opening surfaces of the hemispherical inner shells 10a and 10b put together, a laser welding device irradiates 1 a laser beam L along the connected portion to laser-weld and shape the hemispherical inner shells 10a and 10b to which the fittings 20 are attached into the shape of a container.

Next, as shown in FIG. 3, the reinforcement member 50a is inserted from the opening 210 of one of the fittings 20, and the threaded structures 501 provided at both ends of the fittings 20A and 20B are respectively engaged with the threaded structures 211 of both fittings 20A and 20B (ST3). This allows the expanding deformation and contracting deformation of the inner shell 10 to be restricted.

Figure 4:
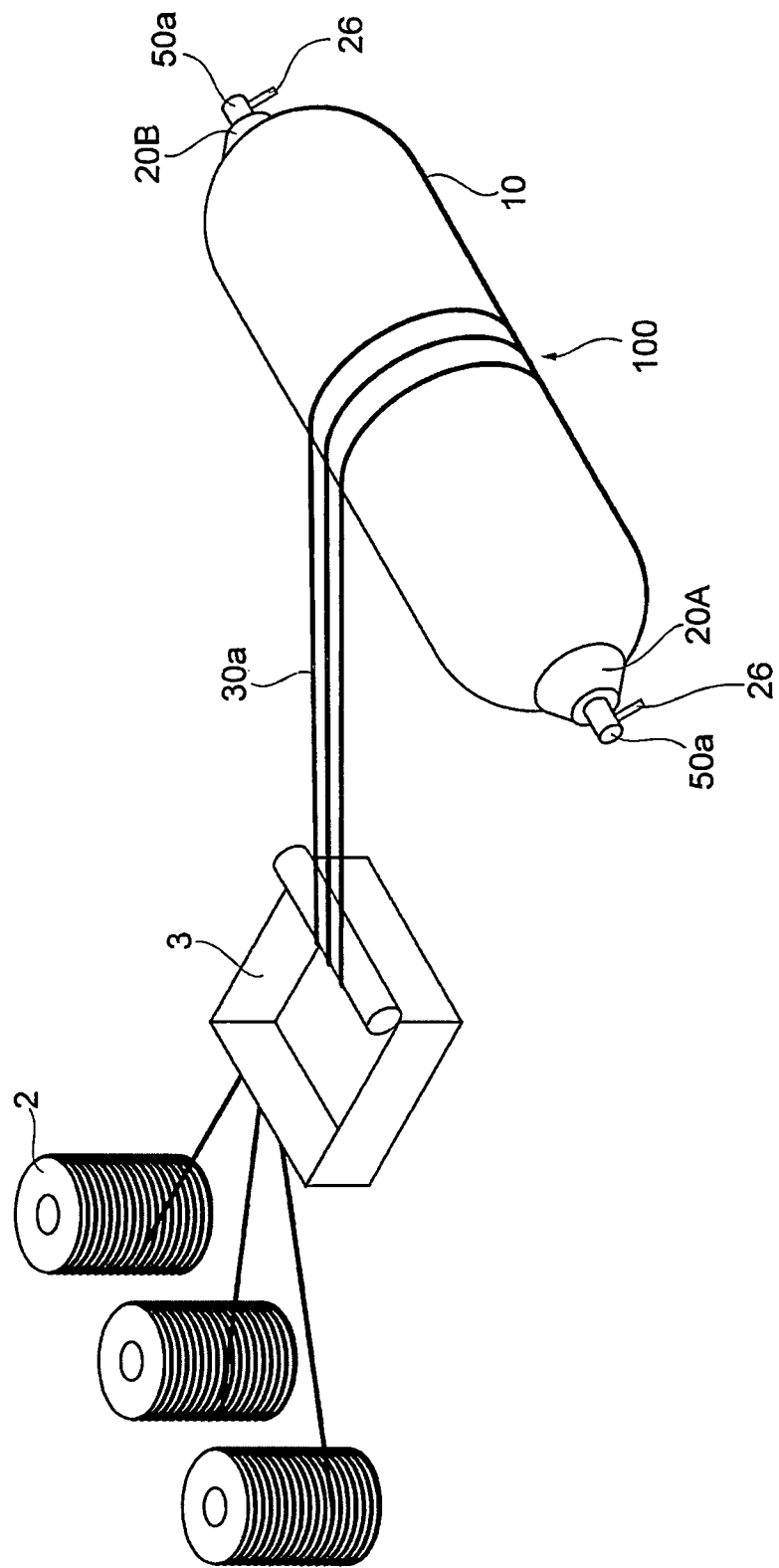
FIG. 4 is a diagram showing a process of winding carbon fibers by a predetermined number of layers.

Next, as shown in FIG. 4, the inner shell 10 with the reinforcement member 50a fixed thereto is set on the filament winding apparatus, and the fixed members 23 of the fittings 20A and 20B are fixed to the filament winding apparatus in a reinforcement-layer forming process (ST4). Then, carbon fibers 30a wound around a carbon fiber roll 2 are wound around the inner shell 10 by a predetermined number of layers for temporary fixation while rotating the inner shell 10. As the carbon fibers 30a are supplied passing through a resin tank 3 filled with a resin material, the carbon fibers 30a are fixed and will not become loose after being wound. At this time, gas is fed into the inner shell 10 from the vent pipe 26 to raise the internal pressure of the inner shell 10 so as to cope with the external pressure which is increased by the winding of the carbon fibers, thereby keeping the balance between the internal pressure and the external pressure.

While various kinds of fibers, such as alamido fibers, glass fibers and polyorefine fibers, besides carbon fibers can be used as fibers to be wound, the fibers are formed by also winding an epoxy resin or the like which is a thermoplastic resin wound from a halfway in the process. The winding of the fibers may be carried out by a tape winding method or any other method besides the filament winding method.

Figure 5:
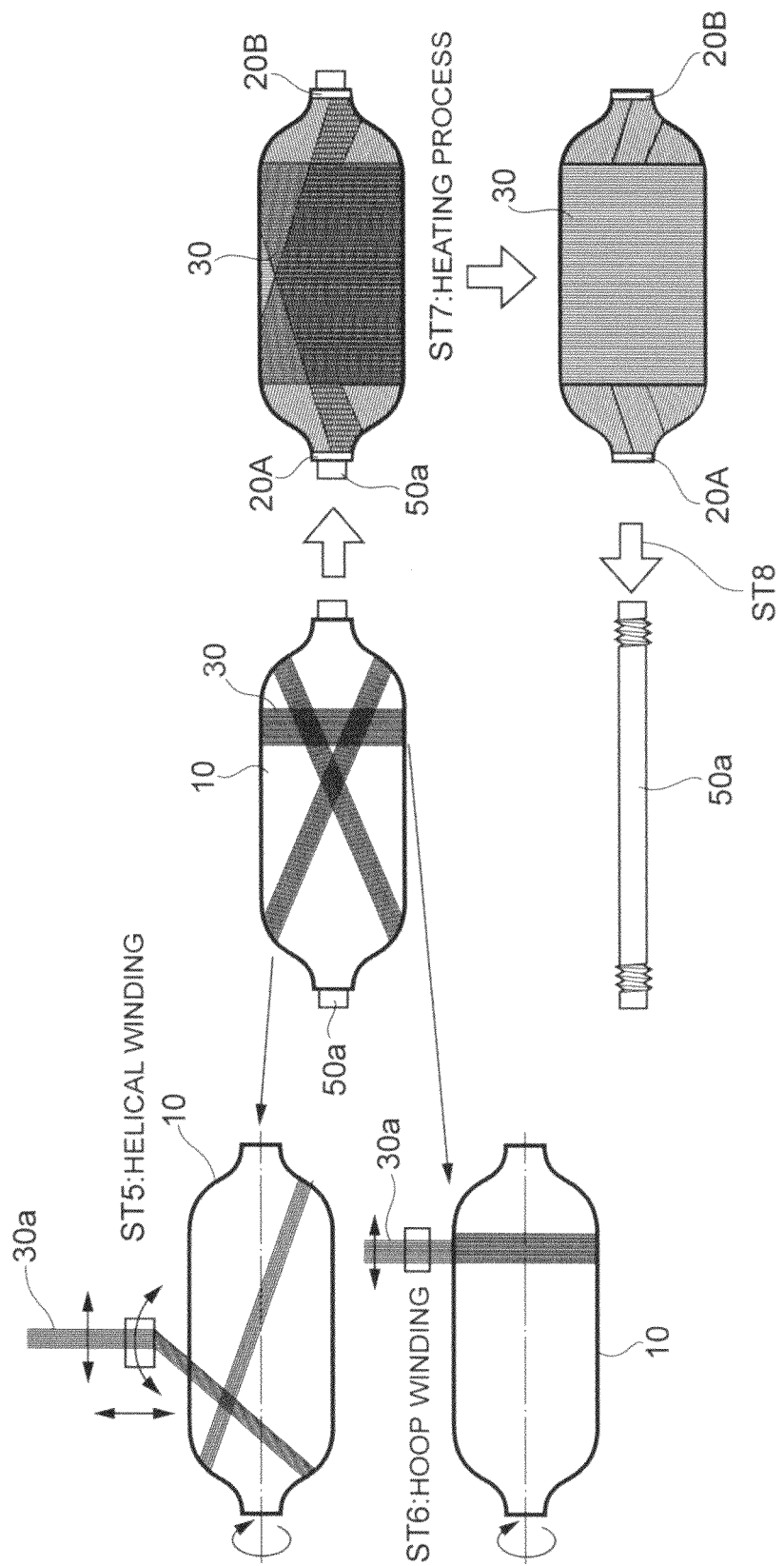
FIG. 5 is a diagram showing processes of a permanent winding of carbon fibers, a heating process and a reinforcement member removing process.

Next, as shown in FIG. 5, the carbon fibers 30a are wound by a defined number until the carbon fibers 30a are laminated to a given thickness to construct the reinforcement layer 30 by using both helical winding (ST5) and hoop winding (ST6) in the permanent winding process. When the permanent winding process is completed, the body of the pressure container 100 is placed in the furnace, and is heated at a predetermined temperature for a given time to harden the carbon fibers in a heating process (ST7). At this time, the internal pressure of the inner shell 10 is kept high.

As the pressure container 100 is taken out of the furnace and is cooled down, the reinforcement member 50 is rotated to be disengaged, and then removed (ST8).

Finally, functional components 60 according to the specifications are attached to the openings 210 of the fittings 20 after removal of the reinforcement member 50a. For example, an attachment valve is attached to one of the fittings, 20A, and a component which closes the opening is attached to the other fitting 20B. The attachment of functional components will be described later in the description of a fourth embodiment.

The production method is efficient and useful because the fittings 20A and 20B are used as attaching means for the reinforcement member 50a to prevent deformation at the time of forming the reinforcement layer, and with the functional components 60 attached in place of the reinforcement member 50a after formation of the reinforcement layer 30, the fittings can be used as attachment end portions (openings 210) for the functional components.

Therefore, it is possible to effectively use the opening 210 after removal of the reinforcement member 50a after the reinforcement-layer forming process of the pressure container 100, and it is unnecessary to provide a new opening 210 even when attaching a functional component 60 which performs a predetermined function, thus simplifying the production process for the pressure container 100.

Second Embodiment

A second embodiment will be described.

While the first embodiment relates to the structure of a deformation restricting part in which the reinforcement member 50a is temporarily fixed to the fittings 20A and 20B by the coupling parts of the threaded structures 211, the second embodiment relates to an example configured in such a way that the interaction of both fittings and the reinforcement member allow them to serve as a stopper, and deformation of the pressure container in the expanding direction is restricted while deformation of the pressure container in the contracting direction is permitted.

Figure 6:
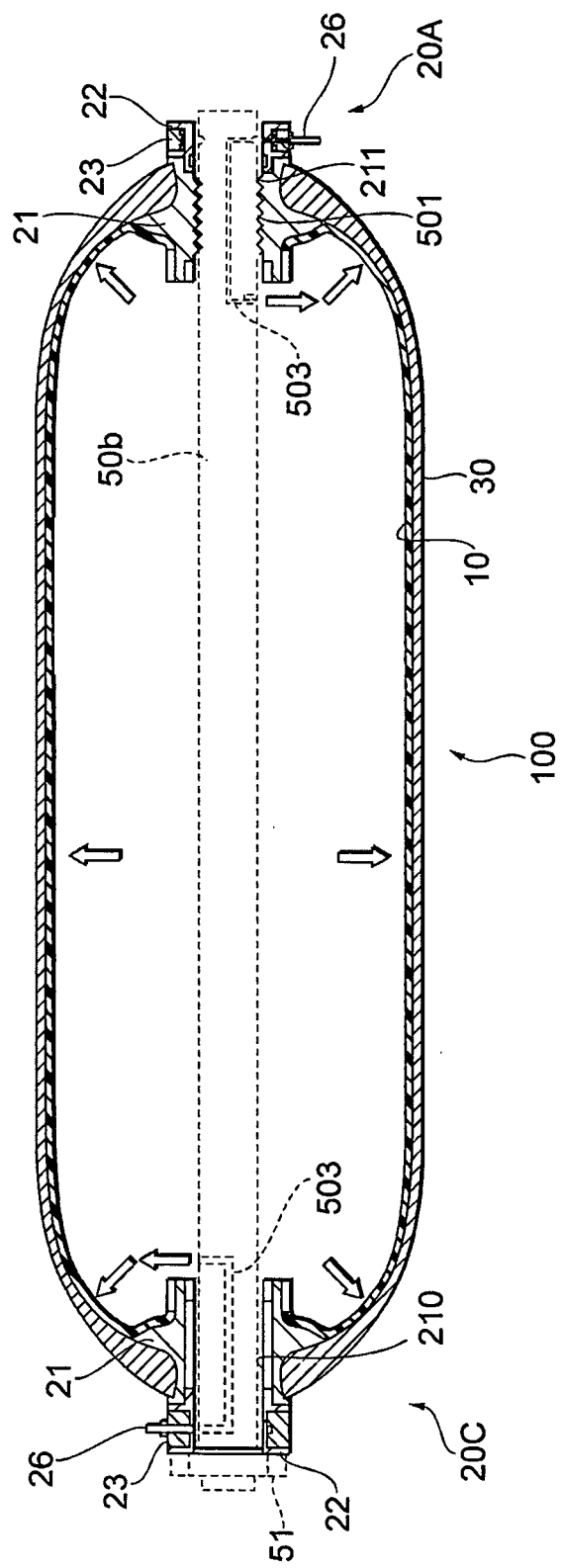
FIG. 6 is a cross-sectional view of a pressure container according to a second embodiment along the axial center.

FIG. 6 is a cross-sectional view of the pressure container according to the second embodiment along the axial center.

As shown in FIG. 6, the pressure container 100 of the second embodiment generally comprises the inner shell (liner) 10, the fittings 20A and 20C, and the reinforcement layer 30. A reinforcement member 50b is shown by a broken line for it is temporarily attached for reinforcement during a reinforcement-layer forming process at the time of producing the pressure container 100, and will be removed when the pressure container 100 is completed. Of the components, the fitting 20C and the reinforcement member 50b differ in structure from those of the first embodiment.

Because the body of the pressure container (100), the inner shell (liner) 10, and the reinforcement layer 30 are identical to those of the first embodiment, their descriptions will be omitted.

As shown in FIG. 6, the metal fittings 20A and 20C according to the second embodiment, like the fittings of the first embodiment, are arranged at both lengthwise ends of the pressure container 100, and the fitting 20A serves as the deformation restricting part and coupling part of the invention, and the fitting 20C serves as a deformation restricting part. Because the second embodiment is the same as the first embodiment in the structure of the fitting 20A, but differs in the structure of the fitting 20C, only the fitting 20C will be described.

The fitting 20C, like the fitting of the first embodiment, generally comprises three parts, the first member 21, the second member 22 and the fixed member 23. The second member 22 relatively rotatably holds the fixed member 23. The first member 21 and the second member 22 are integrated, and the opening 210 is so provided as to communicate with both. Unlike in the first embodiment, however, a threaded structure is not provided at the inner surface of the opening 210, and the reinforcement member 50b is so configured as to be slidable with respect to the inner surface of the opening 210 of the fitting 20C.

The space (slide surface) between the inner surface of the opening 210 and the reinforcement member 50b is sealed by an unillustrated, known seal structure which allows the reinforcement member 50b to be movable relative to the opening 210. Even with the structure, like the structure of the first embodiment, the pressure container 100 can be produced by effectively using the opening 210 to which a functional component 60 like a valve is attached when the pressure container 100 is used.

The reinforcement member 50b used in the second embodiment also differs in structure from that of the first embodiment. That is, while one end portion of the reinforcement member 50b is a coupling part having the threaded structure as in the first embodiment, the other end portion is slidable with respect to the fitting 20C and constitutes a stopper so that while contracting deformation of the pressure container 100 in the lengthwise direction is permitted, expanding deformation is restricted. A threaded structure (not shown) for engagement with a nut 51 is provided in such a way as to be engageable with the nut 51.

The inside diameter of the opening 210 of the fitting 20C is designed greater than the diameter of the reinforcement member 50b, but smaller than the outside diameter of the nut 51 to be attached to the end portion of the reinforcement member 50b. This diameter size relation and the seal structure allow the reinforcement member 50b to be slidable with respect to the fitting 20C while keeping the airtight state when the reinforcement member 50b is attached. As the reinforcement member 50b is attached and the nut 51 is fastened over the threaded structure of the other end portion (fitting 20C side) at the time of production, the fitting 20C becomes slidable in the contracting direction of the inner shell 10 to permit deformation of the inner shell 10, but the nut 51 abuts on the fitting 20C in the expanding direction of the inner shell 10 to serve as a stopper and a deformation restricting part.

With this structure, as in the first embodiment, as the fittings 20A and 20C, i.e., the overall pressure container 100 tends to expand, the deformation restricting part works to restrict the movement thereof. When the internal pressure becomes higher than the external pressure to apply the force which causes expanding deformation in the process of producing the pressure container 100, therefore, deformation of the pressure container 100 in the expanding direction is prevented. As the reinforcement member 50b is attached to the pressure container 100 in the process of forming the reinforcement layer 30, therefore, the mechanical rigidity of the pressure container 100 is increased to prevent expanding deformation of the inner shell 10 of the pressure container 100.

Meanwhile, the second embodiment has a different action from the first embodiment in that the deformation restricting part permits movement in the contracting direction on that side of one fitting 20C.

For example, in helical winding of winding carbon fibers nearly in the lengthwise direction while being tilted in the circumferential direction and lengthwise direction of the pressure container 100, the tension of the carbon fibers wound on the pressure container 100 may work in the lengthwise direction thereof, causing the pressure container 100 to contract in the lengthwise direction, the action of the second embodiment different from that of the first embodiment eliminates or reduces a special countermeasure against the lengthwise contraction of the pressure container 100.

Even in a case where a resin having a property to contract in the process of resin hardening as in, for example, the heating process (ST7) of the first embodiment at the time of producing the pressure container 100 is used as a binder for carbon fibers, the pressure container 100 can be contracted in the hardening process. However, the action of the second embodiment different from that of the first embodiment eliminates or reduces a special countermeasure against such contraction.

Third Embodiment

A third embodiment will be described referring to FIG. 7. The third embodiment relates to an example in which both fittings have stoppers.

Figure 7:
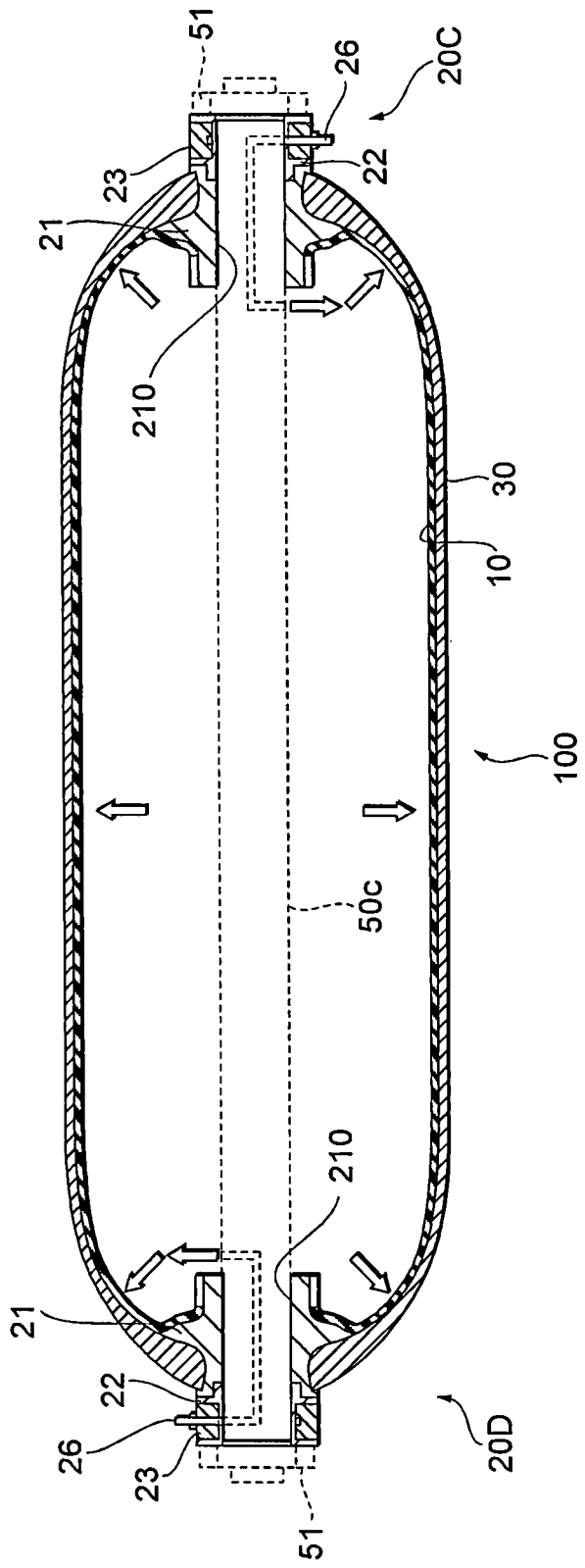
FIG. 7 is a cross-sectional view of a pressure container according to a third embodiment along the axial center.

FIG. 7 is a cross-sectional view of the pressure container according to the invention along the axial center.

As shown in FIG. 7, the pressure container 100 of the third embodiment generally comprises the inner shell (liner) 10, the fittings 20C and 20D, and the reinforcement layer 30. A reinforcement member 50c is shown by a broken line for it is temporarily attached for reinforcement during a reinforcement-layer forming process at the time of producing the pressure container 100, and will be removed when the pressure container 100 is completed.

Because the body of the pressure container (100), the inner shell (liner) 10, and the reinforcement layer 30 are identical to those of the first embodiment, their descriptions will be omitted.

As shown in FIG. 7, the metal fittings 20C and 20D according to the invention, like the fittings of the first embodiment, are arranged at both lengthwise ends of the pressure container 100, and the fittings 20C and 20D serve as the deformation restricting part and coupling part of the invention. Because the fittings 20C and 20D have the same symmetrical structure which is similar to the structure of the fitting 20C of the second embodiment, their descriptions will be omitted.

The reinforcement member 50c used in the third embodiment differs from the above-described embodiment in that the reinforcement member 50c has unillustrated threaded structures at its both ends, and the nuts 51 are attachable to the threaded structures. The inside diameter of the opening 210 of each of the fittings 20C and 20D is designed greater than the diameter of the reinforcement member 50c, but smaller than the outside diameter of the nut 51 to be attached to the end portion of the reinforcement member 50c.

The space (slide surface) between the inner surface of the opening 210 and the reinforcement member 50c, like that of the second embodiment, is sealed by an unillustrated, known seal structure which allows the reinforcement member 50c to be movable relative to the opening 210. It is possible to produce the pressure container 100 by effectively using the opening 210 to which a functional component 60 like a valve is attached when the pressure container 100 is used, as per the first embodiment.

This diameter size relation and the seal structure allow the reinforcement member 50c to be slidable with respect to both of the fittings 20C and 20D while keeping the airtight state when the reinforcement member 50c is attached. As the reinforcement member 50c is attached and the nuts 51 are fastened over both end portions, the fittings 20C and 20D become slidable in the contracting direction of the inner shell 10 to permit deformation of the inner shell 10, but the nuts 51 abut on the fittings 20C and 20D in the expanding direction of the inner shell 10 to serve as a stopper and a deformation restricting part.

With this structure, as in the first embodiment, as the fittings 20C and 20D, i.e., the overall pressure container 100 tends to expand, the deformation restricting part works to restrict the movement thereof. When the internal pressure becomes higher than the external pressure to apply the force which causes expanding deformation in the process of producing the pressure container 100, therefore, deformation of the pressure container 100 at least in the expanding direction is prevented.

As the reinforcement member 50c is attached to the pressure container 100 in the process of forming the reinforcement layer 30, therefore, the physical strength of the pressure container 100 is increased to prevent expanding deformation of the inner shell 10 of the pressure container 100.

Meanwhile, in the third embodiment, like the second embodiment, the deformation restricting part permits movements of the fittings 20C and 20D in the contracting direction, thus eliminating or reducing a special countermeasure against the lengthwise contraction of the pressure container 100 caused by the carbon fibers wound on the pressure container 100 in helical winding or the lengthwise contraction of the pressure container 100 caused by of a cure shrinking resin used as a binder of the carbon fibers.

Fourth Embodiment

A fourth embodiment will be described referring to FIGS. 8 and 9. The fourth embodiment relates to a functional component which performs a predetermined function and which is to be attached to the fitting of a pressure container.

Figure 8:
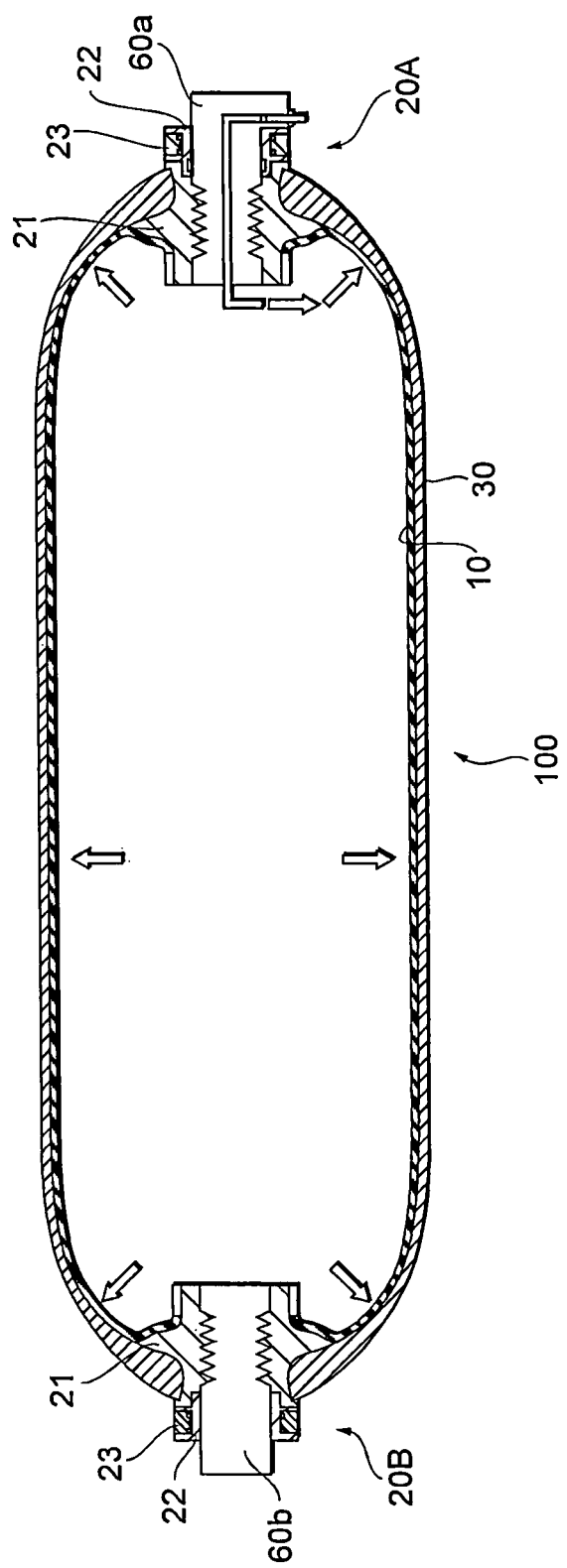
FIG. 8 is a diagram showing attachment of a functional component when the invention is completed.
Figure 9:
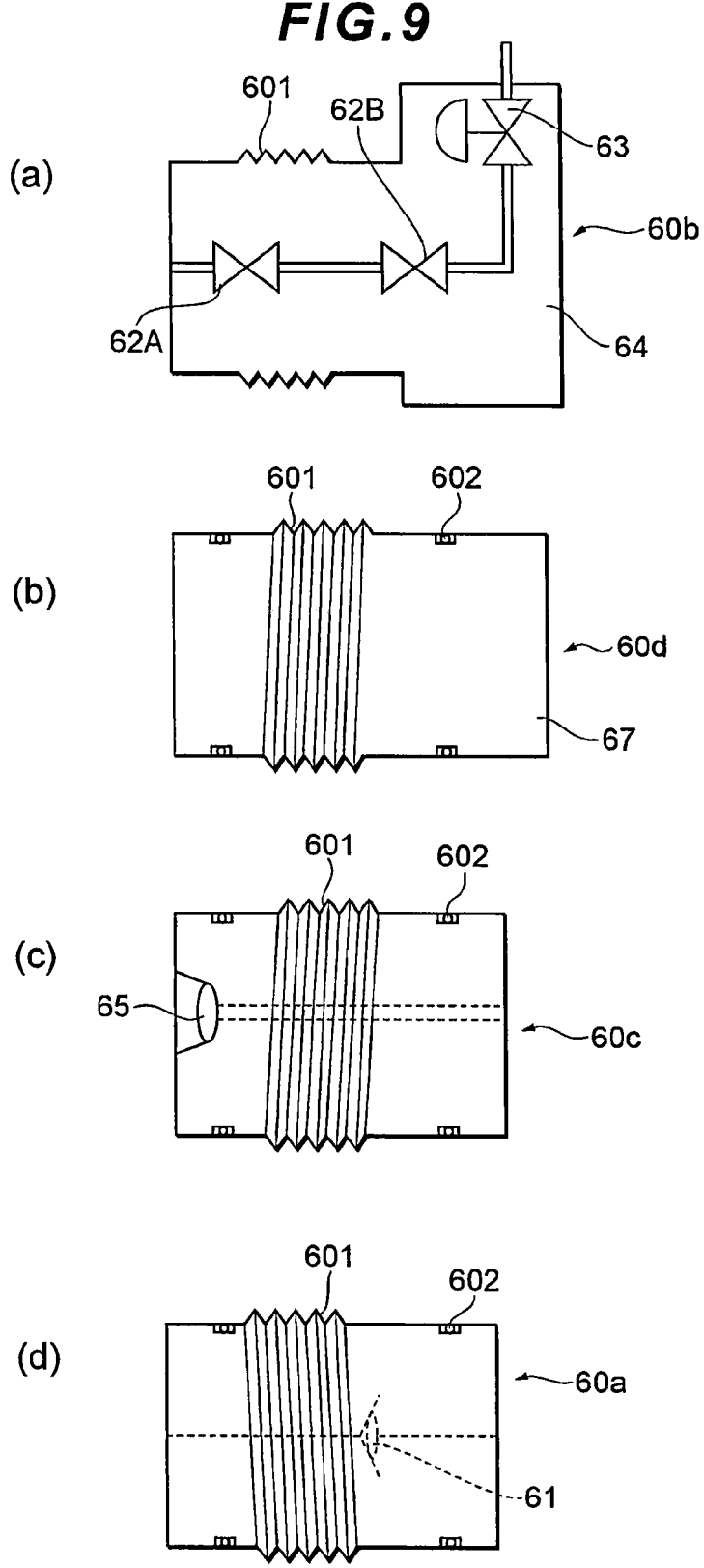
FIG. 9 is a diagram exemplifying a functional component which performs a predetermined function when the pressure container is used.

FIG. 8 shows attachment of a functional component which performs a predetermined function to the pressure container 100. Because the pressure container body (100), the inner shell (liner) 10, the fittings 20A and 20B, and the reinforcement layer 30 are similar to those of the first embodiment, their descriptions will be omitted. That is, the pressure container 100 of the embodiment has the fittings 20A and 20B with the threaded structures 211 at both ends of the inner shell 10. Functional components 60a and 60b according to the embodiment are respectively attached to the fittings 20A and 20B.

Specifically, as shown in FIG. 8, the pressure container 100 of the fourth embodiment generally comprises the inner shell (liner) 10, the fittings 20A and 20B, the reinforcement layer 30, and the functional components 60a and 60b which perform predetermined functions and are attachable to the pressure container. The functional components 60a and 60b are configured to have threaded structures 601 and be engageable with the threaded structures 211 provided at the fittings 20A and 20B. It is sufficient that the functional components 60a and 60b can be coupled to the fittings 20A and 20B while keeping the airtightness, and their functions (types) are selectable in various manners according to the usage of the pressure container 100.

FIG. 9(a) shows the structure of the functional component 60a, and FIG. 9(b) shows the structure of the functional component 60b.

FIG. 9(a) shows the cross-sectional structure of the functional component 60a as a valve assembly. As shown in FIG. 9(a), the functional component 60a has a threaded structure 601 provided therearound, which is engageable with the threaded structure 211 of the fitting 20A or 20B, and has a plurality of valves provided in an internal communication passage. As the valves, shut-off valves 62A and 62B and a regulator valve 63 are provided. Seal members (O rings) are provided at both sides of the threaded structure 601.

FIG. 9(b) shows the structure of the functional component 60d as a seal component.

As shown in FIG. 9(b), the functional component 60b has a threaded structure 601 provided therearound, which is engageable with the threaded structure 211 of the fitting 20A or 20B, and has a seal member (O ring) 602 provided for keeping airtightness at the time of attachment, but has no particular communication passage present inside, and merely provides a seal structure. Such a functional component 60b is used to close the opening 210 of the fitting 20.

As other functional components, various modifications are available.

FIG. 9(c) shows an example of a functional component with a sensor, and FIG. 9(d) shows an example of a functional component with a relief valve.

FIG. 9(c) shows the structure of a functional component 60c as a sensor.

As shown in FIG. 9(c), the functional component 60c has a threaded structure 601 provided therearound, which is engageable with the threaded structure 211 of the fitting 20A or 20B, and has a seal member (O ring) 602 provided for keeping airtightness at the time of attachment. The functional component 60c is provided inside with a pressure sensor 65 as a measuring component to detect a physical amount relating to a fluid state in the pressure container 100. The pressure sensor may be replaced with a sensor which detects another physical amount, such as a temperature sensor.

FIG. 9(d) shows the structure of a functional component 60d as a relief valve.

As shown in FIG. 9(d), the functional component 60d has a threaded structure 601 provided therearound, which is engageable with the threaded structure 211 of the fitting 20A or 20B, and has a seal member (O ring) 602 provided for keeping airtightness at the time of attachment. The functional component 60d is provided inside with a relief valve 61, which, when attached to the fitting 20A or 20B, is opened to release the internal gas when the internal pressure of the pressure container 100 reaches a predetermined valve opening pressure.

Those functional components 60 which perform predetermined functions when the pressure container 100 is used has only to be arranged at the opening 210 of the pressure container 100 with the reinforcement member 50a removed, and may be arranged at either the left or right (either lengthwise end) of the pressure container 100. A combination of functional components 60 having different functions or the same function can be arranged at the respective openings 210.

Further, the functional components of the invention are not limited to those exemplified above, and, for example, a fusible plug valve which releases a fluid out of the interior of the pressure container when the ambient temperature reaches a predetermined condition, a manual vale which releases a fluid out of the interior of the pressure container by the manual operation of an operator, or the like can be used.

Because the functional component 60a or the like is configured to be attachable to the fitting 20A or 20B in the above-described structure, the fittings 20A and 20B can be used to restrict deformation of the pressure container 100 with the reinforcement member 50a attached thereto in the process of producing the pressure container 100, and the functional component 60a or the like can be attached instead of the reinforcement member 50a after the pressure container 100 is completed. This can allow the coupling part to be used for different purposes at the time of production and after completion.

Therefore, the fittings 20A and 20B are used as attachment means for the reinforcement member 50a to prevent deformation at the time of forming the reinforcement layer and are used as attachment end portions (openings 210) of the functional component 60a and the like with the functional component 60a and the like attached, instead of the reinforcement member 50a, after formation of the reinforcement layer 30. The structure can avoid multiple boring processes and reduce the number of steps, and is thus efficient and useful.

The individual embodiments are just illustrative for explaining the present invention, and the invention is not limited thereto, and various structural components can be adequately designed without departing from the scope of the invention.

For example, the reinforcement member and the deformation restricting part (fitting) may not be directly coupled, and may be coupled together via another member. Specifically, the reinforcement member and the deformation restricting part may be configured to be coupled together via a ring-like member which has a male thread and a female thread respectively formed on the outer surface and the inner surface. In this case, the outer surface of the ring-like member is screwed into the female thread formed at the deformation restricting part, and the inner surface of the ring-like member is screwed over the male thread formed on the outer surface of the reinforcement member.

If the inner shell (liner) of the pressure container is made of a metal like aluminum, the deformation restricting part (fitting) of the other end side (end boss side) in the lengthwise direction should not necessarily be separate from the inner shell, but they may be integral. In such a structure, the opening of the inner shell is provided only at one lengthwise end of the pressure container, with the other end of the inner shell being closed. Even in this case, if the structure to couple to the reinforcement member is provided at the other end of the inner shell, expanding deformation of the pressure container in the lengthwise direction can be suppressed.

According to the present invention, with the reinforcement member being attached to the pressure container in the process of forming the reinforcement layer, the mechanical rigidity of the pressure container is increased, so that at least expanding deformation of the inner shell of the pressure container or deformation thereof in the contracting direction in addition to the expanding deformation is prevented.

Further, the present invention can ensure effective use of the opening with the reinforcement member removed after the process of forming the reinforcement layer of the pressure container, eliminates the need for providing a new opening even when attaching a functional component which performs a predetermined function, thus simplifying the process of producing the pressure container.

Therefore, the invention can be widely adapted to a pressure container which should meet those demands and a production method therefor.

We claim:

1. A pressure container having an inner shell and a reinforcement layer formed around the inner shell, comprising:
    a deformation restricting part to which a reinforcement member is attachable in a process of forming the reinforcement layer and which restricts expanding deformation of the inner shell by interaction with the reinforcement member, the reinforcement member attached in the forming process being removed after the pressure container is completed,
    wherein the reinforcement member and the deformation restricting part restrict expanding deformation in a lengthwise direction of the pressure container while permitting contracting deformation, and
    wherein the reinforcement member is slidable with respect to the deformation restricting part at the time of the process of winding fibers to form the reinforcement layer.

2. The pressure container according to claim 1, wherein the deformation restricting part is a pair of fittings provided at the inner shell.

3. The pressure container according to claim 2, wherein at least one of the pair of fittings has a coupling part to couple the reinforcement member thereto.

4. The pressure container according to claim 3, wherein the coupling part is configured so as to detachably couple the fittings and the reinforcement member together.

5. The pressure container according to claim 4, wherein the coupling part is a screw structure for the fittings and the reinforcement member.

6. The pressure container according to claim 4, wherein the coupling part is configured so that a functional component which performs a predetermined function is attachable thereto.

7. The pressure container according to claim 1, wherein there are a pair of deformation restricting parts,
    one end side of the reinforcement member and one of the deformation restricting parts have threaded structures screwable to each other, and
    the other end side of the reinforcement member and the other one of the deformation restricting parts have slidable structures which can ensure relative displacement while keeping an airtight state.

8. The pressure container according to claim 6, wherein the functional component is a seal component provided at at least one of the pair of fittings to seal the pressure container.

9. The pressure container according to claim 6, wherein the functional component is a pipe provided at at least one of the pair of fittings to connect an interior of the pressure container to an outside thereof.

10. The pressure container according to claim 6, wherein the functional component is an assembly of a pipe and a valve member, which are provided at at least one of the pair of fittings to connect an interior of the pressure container to an outside thereof.

11. The pressure container according to claim 6, wherein the functional component is a measuring component provided at at least one of the pair of fittings to detect a physical amount relating to a fluid state in the pressure container.

12. A method of producing a pressure container having an inner shell with a fitting and a reinforcement layer formed around the inner shell, comprising:
    forming the reinforcement layer after providing a reinforcement member, which is slidable with respect to the inner shell at the time of the process of winding fibers to form the reinforcement layer and restricts expanding deformation in a lengthwise direction of the pressure container while permitting contracting deformation at the fitting at the time of forming the reinforcement layer around the inner shell after forming the inner shell;
    removing the reinforcement member from the fitting after forming the reinforcement layer; and
    attaching a functional component which performs a predetermined function to the fitting with the reinforcement member removed therefrom.

13. The pressure container according to claim 5, wherein the coupling part is configured so that a functional component which performs a predetermined function is attachable thereto.

* * * * *